United States Patent [19]

Back et al.

[11] Patent Number: 4,874,848

[45] Date of Patent: Oct. 17, 1989

[54] ASYMMETRICAL POLYAZO CHROMIUM COMPLEX DYES COMPRISING RESORCINOL AS A COUPLING COMPONENT

[75] Inventors: Gerhard Back, Lörrach, Fed. Rep. of Germany; Fabio Beffa, Riehen, Switzerland

[73] Assignee: Ciba-Geigy Corporation, Ardsley, N.Y.

[21] Appl. No.: 873,436

[22] Filed: Jun. 4, 1986

Related U.S. Application Data

[63] Continuation-in-part of Ser. No. 447,351, Dec. 6, 1982, abandoned.

[30] Foreign Application Priority Data

Dec. 15, 1981 [CH] Switzerland ................. 7993/81

[51] Int. Cl.$^4$ .............. C09B 45/06; C09B 45/16; C09B 45/26; D06P 1/10

[52] U.S. Cl. .................. 534/684; 534/685; 534/686; 534/688; 534/722; 534/840

[58] Field of Search ............................ 534/684

[56] References Cited

U.S. PATENT DOCUMENTS

| | | | |
|---|---|---|---|
| 2,985,646 | 5/1961 | Schetty et al. | 260/145 A |
| 3,756,771 | 9/1973 | Beffa | 260/145 A X |
| 3,787,387 | 1/1974 | Wicki | 260/145 A |
| 3,975,369 | 8/1976 | Wicki | 260/145 B |
| 4,120,854 | 10/1978 | Wicki | 260/145 C |

FOREIGN PATENT DOCUMENTS

1116060  6/1968  United Kingdom .......... 534/684 X

*Primary Examiner*—Floyd D. Higel
*Attorney, Agent, or Firm*—Wenderoth, Lind & Ponack

[57] ABSTRACT

Dyes which are 1:2-chromium complexes, containing one azo dye or azomethine dye and one disazo dye or trisazo dye. The dyes are suitable for dyeing wool, synthetic polyamides and leather.

13 Claims, No Drawings

ASYMMETRICAL POLYAZO CHROMIUM COMPLEX DYES COMPRISING RESORCINOL AS A COUPLING COMPONENT

This appliction is a continuation of now abandoned applicaton Ser. No. 447,351, filed Dec. 6, 1982.

The present invention relates to chromium complex dyes of the formula I

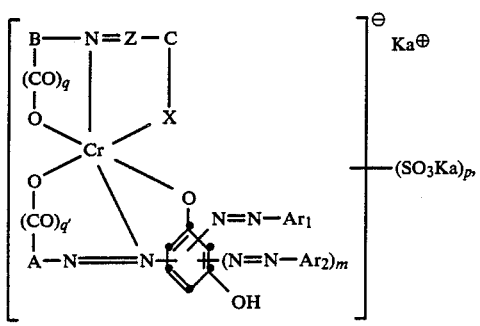

in which

Z is nitrogen or a —CH group,

A is the radical of the diazo component of the benzene or naphthalene series which carriers a hydroxyl or carboxyl group in o-position relative to the azo group, B is a radical of the benzene or naphthalene series which carries a hydroxyl or carboxyl group in o-position relative to the azo or azomethine group, or if $q=1$ and Z is a —CH group the radical of an aliphatic, cycloaliphatic, or aromatic aminocarboxylic acid, C is, when Z is nitrogen, the radical of a coupling component which contains the group X in o- or α-position relative to the azo group and apart from the group X there is no hydroxyl group or unsubstituted amino group if C is a coupling component of the benzene series, or when Z is the —CH group the radical of an o-hydroxyaldehyde, X is oxygen or when Z is nitrogen a group of the formula —NR— in which R is hydrogen or a $C_1$–$C_4$-alkyl group, Ar₁ and Ar₂ independentlyof each other are a substituted or unsubstituted benzene or naphthalene radical or a heterocyclic radical, and m is 0 to 1, q and q' independently of each other are 0 or 1, p is an integer from 0–6, and $Ka^\ominus$ is a cation.

1:2 chromium complex dyes have already been described which contain resorcinol as a coupling component. These dyes are as a rule symmetrical complexes in which the two azo dyes are identical and each has resorcinol as a coupling component.

It has now been found that, surprisingly, those asymmetrical 1:2 chromium complex dyes have particularly valuable properties which consist of a disazo or trisazo dye having resorcinol as the central coupling component and an azomethine dye or an azo dye the coupling component of which has no hydroxyl group apart from a metallizable hydroxyl group.

In the novel chromium complex dyes of the above formula I, the radicals A and B can be further substituted by one or more substituents, for example low molecular weight alkyl or alkoxy, halogen, such as chlorine, bromine, nitro, cyano, sulfo, carboxyl, phosphono, alkylsulfonyl, for example methylsulfonyl, sulfamides, for example sulfamide or sulfomethylamide, or acylamino. For the purposes of this application low molecular weight alkyl or alkoxy group are generally understood as meaning those which have 1 to 6, preferably 1 to 2, C atoms, and "acylamino" refers to low molecular weight alkanoylamino, alkylsulfonylamino, alkylsulfonylamino and alkoxycarbonyl amino radicals as well as sulfonylamino, aroylamino and arylsulfonylamino radicals.

The radicals A and B are derived from, for example, the following amines: anthranilic acid, 4- or 5-chloroanthranilic acid, 4- or 5-sulfoanthranilic acid, 2-amino-3-naphthoic acid, 2-amino-1-hydroxybenzene, 4-chloro- and 4,6-dichloro-2-amino-1-hydroxybenzene, 4- or 5-nitro-2-amino-1-hydroxybenzene, 4-chloro-, 4 methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxy-benzene, 4-sulfonamido-2-amino-1-hydroxybenzene, 1-hydroxy-2-aminobenzene-4-sulfoanthranilide, 4-methoxy-2-amino-1-hydroxybenzene, 4-methoxy-5-chloro-2-amino-1-hydroxybenzene, methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 5-nitro- or 6-nitro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid, 1-amino-2-hydroxy-6-chloro- or 6 bromonaphthalene-4-sulfonic acid, 1-amino-2-hydroxynaphthalene-4,6-disulfonic acid, 2-amino-1-hydroxybenzene-4,6-disulfonic- acid or 6-chloro-2-amino-1-hydroxybenzene-4-sulfonic acid.

Further suitable compounds for use as A and B, in addition to the abovementioned hydroxy-containing amines, are corresponding methoxy compounds or corresponding compounds whose hydroxyl group has been tosylated, such as anisidine, 4- or 5-chloroanisidine, 4- or 5-nitroanisidine, anisidine-4- or -5-sulfonic acid, or tosylated 1-hydroxy-2-aminobenzene, the methoxy or O-tosyl group being converted into an OH group in the metallization. Compounds having these groups are used especially when the corresponding 1-hydroxy-2-amino compounds are poor couplers.

Furthermore, B can also be the radical of an aliphatic or cycloaliphatic aminoacid if $q=1$ and Zis a —CH group. Examples of suitable aminoacids are glycine, α-alanine, β-alanine, phenylglycine, phenylalanine 2-aminocyclohexanecarboxylic acid.

In preferable dyes, A and B independently of each other are the radical of a 1-hydroxy-2-aminobenzene or 1-amino-2-hydroxynaphthalene which is unsubstituted or substituted by halogen, nitro and/or sulfo, in particular the radicals of a 1-amino-2-hydroxy-4-sulfonaphthalene which is unsubstituted or substituted in 6-position by halogen, such as bromine or, in particular, chlorine, nitro or sulfo.

The radical C is preferably derived from the following groups of coupling components: phenols coupling in o-position and unsubstituted or substituted by low molecular weight alkyl or alkoxy, dialkylamino or acylamino which is $C_1$–$C_4$-alkanoylamino, $C_1$–$C_4$-alkylsulfonylamino, $C_1$–$C_4$-alkoxycarbonylamino, aroylamino or arylsulfonylamino radicals; naphthols which are unsubstituted or substituted by $C_1$–$C_4$-alkyl or alkoxy, chlorine, amino, sulfo or acylamino which is as defined above: 5-pyrazolones or 5-aminopyrazoles each of which has in the 1-position a phenyl or naphthyl radical which is unsubstituted or substituted by chlorine, nitro, $C_1$–$C_4$-alkyl or alkoxy groups or sulfo groups and which have in the 3-position a $C_1$–$C_4$-alkyl or carboxyl group, in particular a methyl group; naphthylamines which are unsubstituted or substituted by sulfo, sulfonamido or sulfone groups; acetoacetamides, in particular acetoacetanilides, and benzoylacetanilides which, in the anilide nucleus, can be unsubstituted or substituted by chlorine, bromine, nitro or $C_1$–$C_4$-alkyl, alkoxy or sulfo groups; 6-hydroxy-3-cyano- or 6-hydroxy-3-carboxamido-4-alkyl-2-pyridones which are substituted in the 1-position by substituted or unsubstituted $C_1$–$C_4$-alkyl, for example methyl, isopropyl, $\beta$-hydroxyethyl, $\beta$-aminoethyl or $\gamma$-isopropoxypropyl, or by phenyl, and can carry in the 4-position a $C_1$–$C_4$-alkyl group, in particular methyl, or hydroxyquinolines.

Examples of such coupling components are 2-naphthol, 1-naphthol, 1-acetylamino-7-napthol, 1-propionylamino-7-naphthol, 1-carbomethoxyamino-7-naaphthol, 1-carboethoxyamino-7-naphthol, 1-carbopropoxyamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 4-methyl-1-naphthol, 4-methoxy-1-naphthol, 4-acetyl-1-naphthol, 5,8-dichloro-1-naphthol, 5-chloro-1-naphthol, 2-naphthylamine, 2-naphthylamine-1 sulfonic acid, 1-naphthylamine-4- or -5-sulfonic acid, 2-aminonaphthalene-6-sulfonic acid, 2-aminonaphthalene-5-sulfonic acid, 6-methylsulfonyl-2-aminonaphthalene, 1-phenyl-3-methylpyrazol-5-one, 1-phenyl-5-pyrazolone-3-carboxamide, 1-(2'-, 3'- or 4'-methylphenyl)-3-methylpyrazol-5-one, 1-(2', 3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-(2'-, 3'-, or 4'-chlorophenyl)-3-methylpyrazol-5-one, 1-(2'-, 3'- or 4'-nitrophenyl)-3-methylpyrazol-5-one, 1-(2', 5'- or 3',4'-dichlorophenyl)-3-methylpyrazol-5-one, 1-(2', 5'-dichloro-4'-sulfophenyl)-3-methylpyrazol-5-one, 1-(2', 3'- or 4'-sulfophenyl)-3-methyl-5-aminopyrazole, 1-phenyl-3-methyl-5-aminopyrazole, 1-(2'-chloro-5'-sulfophenyl)-3-methyl-5-aminopyrazole, acetoacetanilide, acetoacetanilide-4-sulfonic acid, acetoacet-o-anisidide, acetoacet-o-toluidide, acetoaceto-o-chloroanilide, acetoacet-m-xylidide, tetralole, 4-methylphenol, 3-dialkylaminophenols, in particular 3-dimethylaminophenol and 3-diethylaminophenol, 4-butylphenol, preferably 4-tert.-butylphenol, 4-amylphenol, in particular 4-t-amylphenol,2-isopropyl-4-methylphenol, 2- or 3-acetylamino-4-methylphenol, 2-methoxycarbonylamino-4-methylphenol, 2-ethoxycarbonylamino-4-methylphenol and 3,4-dimethylphenol, 1-methyl-3-cyano-4-ethyl-6-hydroxypyridone, 1-methyl-3-cyano-4-methyl-6-hydroxypyridone, 1-phenyl-3-carboxamido-4-methyl-6-hydroxypyridone, and 1-ethyl-4-hydroxy-2-quinolone.

The coupling component C is preferably 1- or 2-naphthol which is unsubstituted or substituted by amino and/or sulfo, 1- or 2-naphthylamine which is unsubstituted or substituted by sulfo, p-alkyl($C_1$–$C_6$)-phenol, 1-phenyl-3-methyl-5-pyrazolone or acetoacetanilide, where the phenyl group in the two latter compounds can be substituted by $C_1$–$C_4$-alkyl, $C_1$–$C_4$-alkoxy, chlorine or sulfo.

When Z is the —CH group, C is the radical of an o-hydroxyaldehyde, preferably of an o-hydroxybenzaldehyde or o-hydroxynaphthaldehyde, which can be substituted by low molecular weight alkyl, halogen, sulfo, phenylazo, sulfophenylazo, naphthylazo or sulfonaphthylazo. Examples of suitable aldehydes are 2-hydroxy-1-naphthaldehyde, 1-hydroxy-2-naphthaldehyde, 2-hydroxy-benzaldehyde, 3- and 5-methyl-2-hydroxybenzaldehyde, 3,5-dimethyl-2-hydroxybenzaldehyde, 5-butyl-2-hydroxybenzaldehyde, 5-chloro or 5-bromo-2-hydroxybenzaldehyde, 3-chloro-2-hydroxybenzaldehyde, 3,5-dichloro-2-hydroxybenzaldehyde, 5-sulfo-2-hydroxybenzaldehyde, 3-methyl-5-chloro-2-hydroxybenzaldehyde, 5-(phenylazo)-2-hydroxybenzaldehyde, 5-(2'-, 3'- or 4'-sulfophenylazo)-2-hydroxybenzaldehyde, 5-(6'-sulfonaphthyl-1'-azo)-2-hydroxybenzaldehyd or 5-(4''-sulfo-4'-phenylazo)-phenylazo-2-hydroxybenzaldehyde.

$Ar_1$ and $Ar_2$ independently of each other are a benzene or naphthalene radical or a heterocyclic radical, and can carry substituents customary in diazo components. When $Ar_1$ or $Ar_2$ is a heterocyclic radical, it is, for example, a thiazolyl, benzothiazolyl, imidazolyl, quinolinyl, oxazolyl or benzoxazolyl radical.

However, $Ar_1$ and $Ar_2$ are preferably a phenyl radical which is unsubstituted or substituted by chlorine, bromine, nitro, sulfo, sulfamoyl, N-monoalkylated or N,N-dialkylated sulfamoyl, alkylsulfonyl, alkyl or alkoxy, or a naphthyl radical which is unsubstituted or substituted by sulfo.

m is a number between 0 and 1, which means that the radical —N=N—$Ar_2$ can be present in the dye of the formula I even in a non-stoichiometric amount. The invention thus relates to mixtures of dyes which have this radical with dyes which do not have this radical.

$Ka^\ominus$ is preferably lithium, potassium or especially sodium. $Ka^\ominus$ can also be an ammonium cation or the ammonium salt of an organic amine.

Particularly preferable dyes according to the invention are of the formula II

| Adhesive Hardener Blend | |
|---|---|
| Aminoethylpiperazine | 30 parts by weight |
| Amicure PACM | 30 parts by weight |
| Ancamine 1770 | 40 parts by weight |
| Dicyandiamide | 2 parts by weight |
| DEN438 or EPN1138 | 25 parts by weight | in which
Z is nitrogen or a CH group,
A is the radical of a diazo component of the benzene or naphthalene series which carries a hydroxyl group in o-position relative to the azo group,
B' is a radical of the benzene or naphthalene series which carries a hydroxyl group in o-position relative to the azo or azomethine group,
C is, when Z is nitrogen, the radical of a coupling component which carries a hydroxyl group in o- or $\alpha$-position relative to the azo group and apart from the metallized hydroxyl group has no further hydroxyl group and no unsubstituted amino group if C is a coupling component of the benzene series, or, when Z is the CH group, the radical of an o-hydroxyaldehyde, Ar₂ is a substituted or unsubstituted benzene or naphthalene radical or a heterocyclic radical,
n is a number between 1 and 2,
p' is 2, 3 or 4, and
Ka$^\oplus$ is a cation.

Of these dyes, those are particularly preferable which have the formula II in which A and B' independently of each other are the radical of a 1-hydroxy-2-aminobenzene or 1-amino-2-hydroxynaphthalene, which radical is unsubstituted or substituted by halogen, nitro and/or sulfo, Z is nitrogen, C is 1- or 2-naphthol which is unsubstituted or substituted by amino and/or sulfo, 1- or 2-naphthylamine which is unsubstituted or substituted by sulfo, p-alkyl-($C_1$-$C_6$)-phenol, 1-phenyl-3-methyl-5-pyrazolone or acetoacetanilide, where the phenol group in the two latter compounds can be substituted by $C_1$-$C_4$-alkyl, $C_1$-$C_4$-alkoxy, chlorine or sulfo, or Z is a —CH group and C is the radical of an o-hydroxybenzaldehyde or o-hydroxynaphthaldehyde, which radical can be substituted by low molecular weight alkyl, halogen, sulfo, phenylazo, sulfophenylazo, naphthylazo or sulfonaphthylazo, Ar₂ is a phenyl radical which is unsubstituted or substituted by chlorine, bromine, nitro, sulfo, sulfamoyl, N-monoalkylated or N,N-dialkylated sulfamoyl, alkylsulfonyl, alkyl or alkoxy or a naphthyl radical which is unsubstituted or substituted by sulfo, p' is 2, 3 or 4, and Ka$^\oplus$ is a cation.

Of these dyes those are particularly suitable for dyeing leather which have the formula II in which A and B' independently of each other are the radical of a 1-amino-2-hydroxy-4-sulfonaphthalene which in the 6-position is unsubstituted or substituted by halogen, nitro or sulfo, and the remaining symbols are as defined above.

Owing to their great hiding power on leather and the good fastness properties of the resulting dyeings, particularly preferable dyes are of the formula III

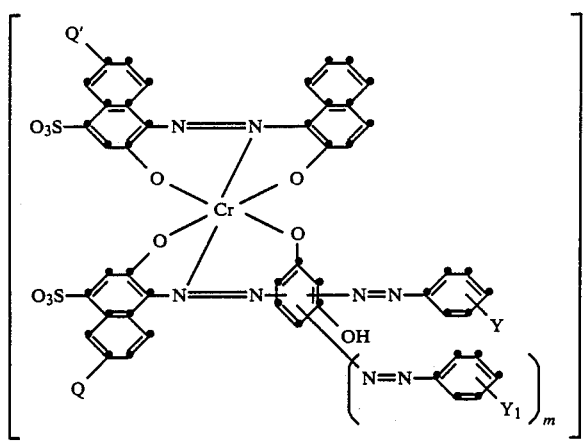

(III)

3 Na$^\oplus$ in which Y and Y₁ independently of each other are hydrogen, chlorine, methyl, ethyl, methoxy, ethoxy, sulfo or nitro, Q and Q' independently of each other are hydrogen or nitro, and m is 0 to 1.

Of these dyes those are particularly preferable in which Q and Q' are nitro and Y and Y₁ are chlorine.

Dyes according to the invention can be prepared by methods which are in themselves known, for example by preparing the 1:1 chromium complex of a dye of the formula IV

TABLE 1

| | |
|---|---|
| Usable Life at 80° F. | 20 min. |
| DSC Glass Transition Temperature | 127° C. (261° F.) |
| Aluminum Lap Shear Values: | |
| At 75° F. | 1600 psi |
| At 150° F. | 1750 psi |
| At 200° F. | 1875 psi |
| At 250° F. | 1600 psi |
| Electrical resistance across 0.020" bond aluminum to aluminum, cured 1 hour at 250° F. | less than 100 ohms | or of a dye of the formula V

(V)

then reacting this 1:1 chromium complex with a non-metallized dye of the formula V or IV respectively to give the asymmetrical 1:2 chromium complex, where either previously the dye of the formula IV or the 1:1 complex of this dye, or subsequently the 1:2 complex formed is coupled to one to two moles of a diazonium compound of the formula VI

(VI).

A, B, C, Z, X, q, Ar₁ and Ar₂ are as defined under the formula I, and Y$^\ominus$ is an anion, for example chloride. It is also possible to use mixtures of 2 or more different diazonium compounds.

Preferably a dye of the formula IV is reacted with the 1:1 chromium complex of a dye of the formula V, to give the 1:2 chromium complex, which is then coupled with a diazonium compound of the formula VI.

When coupling a diazonium compound of the formula VI with a monoazo dye of the formula IV or with chromium complexes containing this dye, the diazonium compound and the dye or the chromium complex are used in a ratio of 1:1 to about 2:1, so that one to two azo groups are introduced. However, a ratio of 1:1 does not normally produce a pure compound but a mixture which contains a proportion of compound having 2 newly introduced azo groups and unchanged dye of the formula IV or chromium complexes containing this dye.

In a preferable method of preparing dyes according to the invention, a mixture of an azo dye of the formula IV with an azo or azomethine dye of the formula V is reacted with a chroming agent, and the product is coupled with a dizonium compound of the formula VI, so that mixtures of 1:2 chromium complexes are obtained. These mixtures consist of the asymmetrical 1:2 chromium complex of the formula I and symmetrical 1:2 complexes containing 2 molecules of dye of the formulae IV or V. In this preparation method the dyes of the formulae IV and V are preferably used in a ratio of 20:80 to 80:20, in particular 40:60 to 60:40. The 1:2 chromium complex mixtures obtainable by this method of preparation are a preferable subject of the present invention.

The coupling reaction and the chroming are carried out using customary methods.

The new metal complex dyes which can be obtained using the above methods are advantageously isolated in the form of their salts, in particular alkali metal, such as lithium, potassium or especially sodium salts, or ammonium salts. They are suitable for dyeing a very wide variety of natural or synthetic nitrogen- and hydroxy-containing materials, such as polyamides or polyurethanes, but in particular for dyeing wool or especially leather.

Those metal complex dyes of the formula I which have only 0–2 sulfo groups may also be isolated as amine salts. These are suitable for, for example, spraying leather and coloring organic liquids, paints, and polymers.

The new dyes have high tinctorial strength and great hiding power. They combine good affinity with good fastness properties, such as fastness to washing, water, perspiration, rubbing, diffusion, light, acid, and alkali, and with stability under acid or alkaline conditions. Particularly noteworthy is the good build-up on diverse types of leather, namely not only on leather tanned with chromium salts but also on leather retanned with vegetable or synthetic tanning agents. Deep brown, olive, grey or black shades are obtained.

In the examples which follow the parts are parts by weight and the percentages are percentages by weight unless otherwise indicated. The temperatures are given in degrees centigrade.

In the examples, the azo links to the resorcinol are assigned a fixed geometry in those cases where, according to the present state of knowledge the bonding position for the main product can be stated with some certainty. However, the formulae given are intended also to embrace the corresponding positional isomers, which are formed in greater or lesser proportions.

EXAMPLE 1

40.5 parts of the monoazo dye which can be prepared by known methods from 1-diazo-2-hydroxy-6-nitronaphthalene-4-sulfonic acid and 1,3-dihydroxybenzene are suspended in 500 parts of water at 60° and the suspension is acidified to pH 2 by adding 30 parts of 2N sulfuric acid. 22 parts of basic chromium-(III) sulfate are added, and the reaction mixture is heated to the boil and then stirred under reflux until the metal-free monoazo dye is no longer detectable.

The mixture is cooled down to 50°, and the reddish voilet 1:1 chromium complex of the monoazo dye which has precipitated in the form of crystals is isolated by filtration and washed with dilute sodium solution until acid-free.

The 1:1 chromium complex, in the form of a soda paste, is suspended with stirring in 1,000 parts of water, and the suspension is converted into a reddish violet, clear solution of pH 9–9.5 by the dropwise addition of a 15% sodium hydroxide solution. 250 parts of ice are added, and then a solution of benzenediazonium chloride prepared in a conventional manner from 11.6 parts of 1-aminobenzene, with additional cooling in an ice-water bath and, simultaneously, a pH of 8.5–9,.5 is maintained by sprinkling in anhydrous sodium carbonate. The resulting bluish black 1:1 chromium complex of the disazo dye is partially precipitated in the course of a few hours, and is completely precipitated by adding sodium chloride. The dye paste obtained on filtration is washed with dilute sodium chloride solution, compressed, and suspended in 2,000 parts of water at 90°. The resulting suspension is reacted with stirring at 90°–95° and at pH 7.0–7.5 with about 40 parts of the monoazo dye which can be prepared in a conventional manner from 1-diazo-2-hydroxy-6-nitronaphthalene-4-sulfonic acid and 2-hydroxynaphthalene, giving a single product, namely the asymmetrical chromium complex of the following structure:

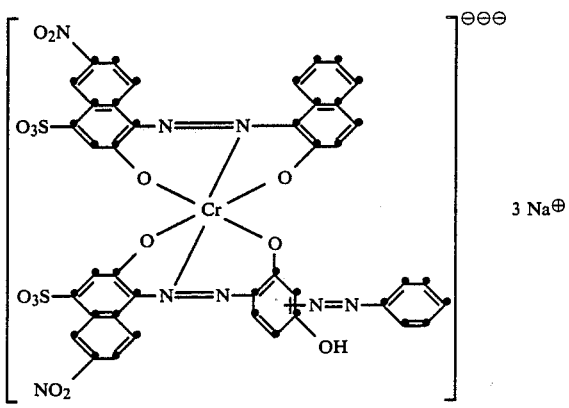

The addition reaction is monitored by means of thin layer chromatography, and if necessary corrected by adding further metal-free monoazo dyes, until the two components of the mixed complex have been completely consumed.

The new complex dye, which is in the form of a pure black solution, is precipitated at 50° by sprinking in sodium chloride, isolated by filtration, washed with dilute sodium chloride solution, and dried in vacuo at 80°. The yield is about 130 parts of a readily water-soluble dye which dyes chromed leather and retanned leather in high-hiding, fast black shades by the methods given in the dyeing example.

EXAMPLE 2

43.9 parts of the monoazo dye which can be prepared by known methods from 1-diazo-2-hydroxy-6-nitronaphthalene-4-sulfonic acid and 2-hydroxynaphthalene and which is in the form of the 1:1 chromium complex and 40.5 parts of the monoazo dye mentioned in Example 1 and prepared from 1-diazo-2-hydroxy-6-nitronaphthalene-4-sulfonic acid and 1,3-dihydroxybenzene are suspended together in 1,000 parts of water at 70°. The reaction mixture is brought to a pH 6.5–7.5 by the dropwise addition of 1N sodium hydroxide solution, and then stirred at 90°–95° until the two starting materials are no longer detectable.

The resulting, deep violet solution of the single, asymmetrical chromium complex is cooled down to 0°–3°, and 12 parts of anhydrous sodium carbonate are added, giving a reddish violet solution at pH 9.0–9.5. Thereafter a solution of benzenediazonium chloride prepared in a conventional manner from 11.6 parts of aminobenzene is added dropwise at 0°–5°, while the pH is maintained at 8.5–9.5 by means of a 4N sodium carbonate solution.

As soon as the coupling has ended, the pure black solution obtained is heated to 50° and the dye isolated as in Example 1. The dye obtained is identical to the complex described in Example 1, not only by thin layer chromatography but also in its coloristic properties.

EXAMPLE 3

The monoazo dye prepared from 1-diazo-2-hydroxy-6-nitronaphthalene-4-sulfonic acid and 1,3-dihydroxybenzene and which is in the form of the 1:1 chromium complex described in Example 1 is reacted as described in Example 2 with the metal-free monoazo dye prepared from 1-diazo-2-hydroxy-6-nitronaphthalene-4-sulfonic acid and 2-hydroxynaphthalene to give a single product, namely the mixed complex, which is coupled with a solution of benzenediazonium chloride obtained from 13.95 parts of 1-aminobenzene. The complex dye formed is similar to those in Examples 1 and 2.

If the mixed complex is coupled with the diazonium compound prepared from 15.6 parts of 4-chloro-1-aminobenzene, the dye obtained is structurally analogous and dyes leather in full black shades.

EXAMPLE 4

40.5 parts of the monoazo dye which can be obtained by known methods from 1-diazo-2-hydroxy-6-nitronaphthalene-4-sulfonic acid and 1,3-dihydroxybenzene are suspended in 500 parts of water. 40 parts of sodium acetate crystals are added, the mixture is cooled down to 3°–8°, and the diazonium compound solution obtained in a conventional manner from 25.5 parts of 4-chloro-1-aminobenzene is added dropwise with stirring. About 20 parts of sodium acetate are added during a few hours, to maintain pH 5, during which the coupling is completed by further stirring. The olive green trisazo dye of the structure.

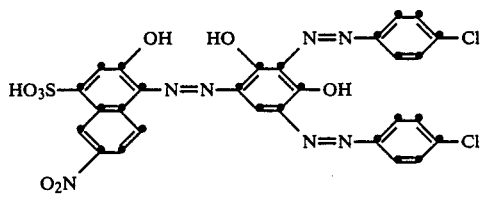

completely precipitates during the coupling, is isolated by filtration and washed with dilute sodium chloride solution.

The metal-free trisazo dye obtained is then reacted as in Example 2 with 43.9 parts of the monoazo dye prepared from 1-diazo-2-hydroxy-6-nitronaphthalene-4-sulfonic acid and 2-hydroxynaphthalene, and which is in the form of the 1:1 chromium complex, to give a single product, namely an asymmetrical complex which has a structure analogous to that in Example 1, and is precipitated, isolated, and dried, all three steps being carried out as described above. The yield is about 140 parts of a readily water-soluble dye which gives full, greenish black dyeings on chromed leather and retanned leather.

EXAMPLE 5

35.5 parts of the monoazo dye which can be prepared by known methods from 1-hydroxy-2-amino-4-nitrobenzene-6-sulfonic acid and 1,3-dihydroxybenzene and 41.9 parts of the conventionally prepared 1:1 chromium complex of the monoazo dye prepared from 1-hydroxy-2-amino-4-nitrobenzene-6-sulfonic acid and 1-phenyl-3-methyl-3-pyrazolone are suspended in 500 parts of water. The reaction mixture is heated to 90°–95° with stirring, and maintained at pH 7.0–7.5 by the dropwise addition of 2N sodium carbonate solution. This rapidly gives a clear, orange-red solution of the single product, namely the asymmetrical chromium complex.

The reaction solution is cooled down to 0°–5°, and the diazonium compound prepared in a conventional manner from 24.5 parts of 1-aminonaphthalene-6-sulfonic acid is added a little at a time, at pH 8.5–9.5, maintained by adding anhydrous sodium carbonate. The resulting, reddish brown complex dye of the structure

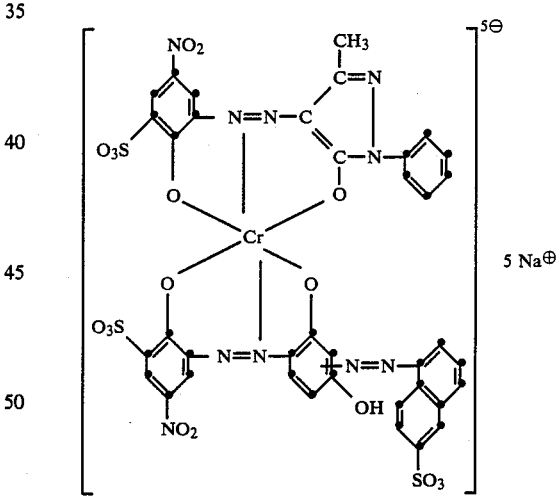

is precipitated by adding sodium chloride, isolated by filtration, and washed with sodium chloride solution. Drying in vacuo at 80° and grinding give the new dye as a readily water-soluble powder with which full reddish brown dyeings having good fastness properties can be obtained on chromed leather and on retanned leather.

The Table which follows shows further complex dyes which can be obtained from the dyes of columns I and II by following the procedure in Examples 1–5 and using in each instance one of the dyes of the two columns as the 1:1 chromium complex. Column II indicates the shades which can be obtained on leather.

| | I | II | III Shade |
|---|---|---|---|
| 1. | [structure: naphthalene with OH, HO3S, Cl, N=N, naphthalene with OH] | [structure: HO3S, OH, N=N, OH, OH, N=N, Cl, NO2]₂ | Black |
| 2. | [structure: naphthalene with OH, HO3S, N=N, naphthalene with OH] | " | Black |
| 3. | [structure: naphthalene with OH, HO3S, SO3H, N=N, naphthalene with OH] | " | Black |
| 4. | [structure: O2N, OH, NO2, N=N, OH, SO3H naphthalene] | [structure: OH, N=N, OH, OH, N=N, Cl, HO3S, NO2]₂ | Greenish black |
| 5. | [structure: OH, HO3S, NO2, N=N, OH, SO3H, NH2 naphthalene] | " | Black |
| 6. | [structure: OH, HO3S, NO2, N=N, OH, SO3H, NH2 naphthalene] | " | Brownish black |
| 7. | [structure: OH, NO2, N=N, NH2, SO3H naphthalene] | [structure: OH, N=N, OH, OH, N=N, Cl, HO3S, NO2] | Greenish black |
| 8. | [structure: OH, NO2, N=N, NH2, SO3H naphthalene] | " | Greenish black |

-continued

| | I | II | III Shade |
|---|---|---|---|
| 9. | [structure: 2-hydroxy-3-nitro-5-sulfo-phenyl-N=N-2-hydroxynaphthyl] | " | Brownish black |
| 10. | [structure: 2-hydroxy-5-nitrophenyl-N=N-pyrazolone with CH3, C=O-N-phenyl-SO3H] | [structure: 8-hydroxy-7-sulfo-5-nitronaphthyl-N=N-dihydroxyphenyl-N=N-4-chlorophenyl] | Dark brown |
| 11. | [structure: 2-hydroxy-3-sulfo-5-nitrophenyl-N=N-pyrazolone with CH3, C=O-N-phenyl] | " | Dark brown |
| 12. | [structure: 2-hydroxy-3-sulfo-5-nitrophenyl-N=N-2-hydroxy-5-tert-butylphenyl] | " | Dark brown |
| 13. | [structure: 1-hydroxy-4-sulfo-6-nitronaphthyl-N=N-2-hydroxynaphthyl] | | Black |
| 14. | [structure: 1-hydroxy-4-sulfonaphthyl-N=N-2-hydroxynaphthyl] | [structure: 8-hydroxy-7-sulfo-5-nitronaphthyl-N=N-dihydroxyphenyl-N=N-4-chlorophenyl] | Black |
| 15. | [structure: 2-hydroxy-3-sulfo-5-nitrophenyl-N=N-C(OH)=C(CH3)-CO-NH-phenyl] | " | Brown |
| 16. | [structure: 2-hydroxy-3-sulfo-5-nitrophenyl-N=N-C(OH)=C(CH3)-CO-NH-2-chlorophenyl] | " | Brown |

-continued

| | I | II | III Shade |
|---|---|---|---|
| 17. | 3-hydroxy-4-[(2-hydroxynaphthalen-1-yl)azo]-5-nitro-naphthalene-1-sulfonic acid | bis-azo coupling product with phenyl [ ]₂ | Black |
| 18. | same naphthol sulfonic acid azo naphthol | coupling with 2-chloro-5-sulfo-phenyl | Black |
| 19. | same naphthol sulfonic acid azo naphthol | " | Black |
| 20. | same naphthol sulfonic acid azo naphthol | coupling with 4-nitro-2-sulfo-phenyl | Black |
| 21. | same naphthol sulfonic acid azo naphthol | " | Black |
| 22. | " | coupling with 3-nitro-4-sulfo-phenyl | Brownish black |
| 23. | same naphthol sulfonic acid azo naphthol | coupling with 2-methyl-5-sulfo-phenyl | Black |
| 24. | same naphthol sulfonic acid azo naphthol | " | Black |

-continued

| | I | II | III Shade |
|---|---|---|---|
| 25. | " | [structure] | Violet-tinged black |
| 26. | [structure] | [structure] | Violet tinged black |
| 27. | " | [structure] | Black |
| 28. | " | [structure] | Black |
| 29. | [structure] | [structure] | Dark brown |
| 30. | [structure] | " | Dark brown |
| 31. | [structure] | [structure] | Reddish brown |

-continued

| | I | II | III Shade |
|---|---|---|---|
| 32. | (structure: chlorosulfohydroxyphenyl-azo-pyrazolone with phenyl) | " | Violet-tinged brown |
| 33 | (structure: sulfo-nitro-hydroxyphenyl-azo-naphthol) | (structure: sulfo-nitro-hydroxyphenyl-azo-dihydroxyphenyl-azo-chlorophenyl)₂ | Brown |
| 34 | (structure: sulfo-nitro-hydroxynaphthyl-azo-naphthol) | (structure: sulfo-hydroxyphenyl-azo-dihydroxyphenyl-azo-dichlorophenyl) | Brownish black |
| 35 | (structure: sulfo-hydroxynaphthyl-azo-naphthol) | (structure: carboxy-phenyl-azo-dihydroxyphenyl-azo-sulfophenyl) | Olive brown |
| 36 | (structure: sulfo-nitro-hydroxyphenyl-azo-aminonaphthalene) | (structure: carboxy-phenyl-azo-dihydroxyphenyl-azo-nitrophenyl)₂ | olive green |
| 37 | (structure: sulfo-nitro-hydroxyphenyl-azo-pyrazolone with phenyl) | (structure: carboxy-phenyl-azo-dihydroxyphenyl-azo-chlorophenyl) | Yellowish brown |
| 38 | (structure: sulfo-nitro-hydroxyphenyl-azo-dimethyl-hydroxyphenyl) | " | Yellowish brown |
| 39 | (structure: sulfo-nitro-hydroxyphenyl-azo-naphthol) | (structure: hydroxy-sulfophenyl-azo-dihydroxyphenyl-azo-sulfonaphthyl) | Brown |
| 40 | (structure: sulfo-nitro-hydroxynaphthyl-azo-naphthol) | (structure: nitro-sulfo-hydroxyphenyl-azo-dihydroxyphenyl-azo-dimethoxy-sulfophenyl) | Brownish violet |

| | I | II | III Shade |
|---|---|---|---|
| 41 | | | Olive brown |
| 42 | | | Brownish black |

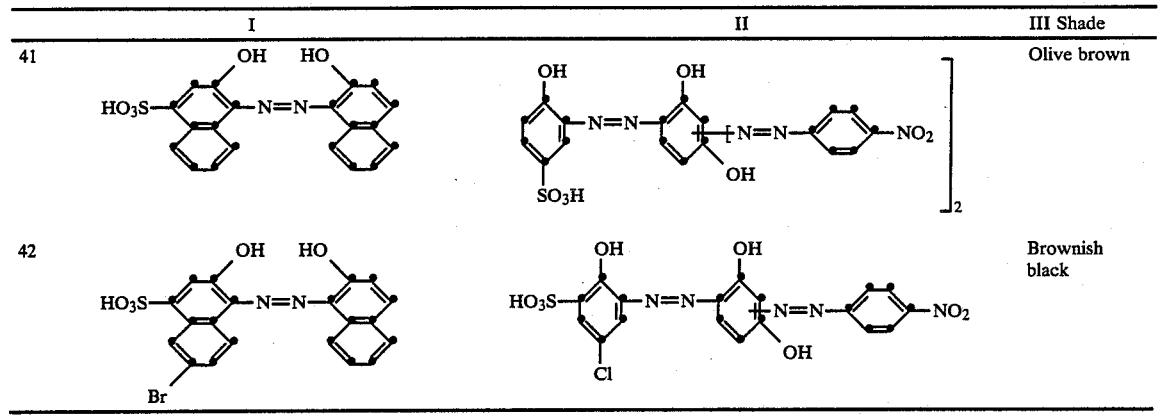

EXAMPLE 6

43.9 parts of the monoazo dye prepared from 1-diazo-2-hydroxy-6-nitronaphthalene-4-sulfonic acid and 2-hydroxynapthalene, and which is in the form of the 1:1 chromium complex, and 40.5 parts of the monoazo dye mentioned in Example 1 and prepared from 1-diazo-2-hydroxy-6-nitronaphthalene-4-sulfonic acid and 1,3-dihydroxybenzene are reacted as in Example 2 to give a single product, namely the asymmetrical complex. The deep violet reaction solution obtained is cooled down to 3°–8°, and 12 parts of anhydrous sodium carbonate are added. A solution of the diazonium compound prepared in a conventional manner from 16.4 parts of 2-amino-benzene-1-carboxylic acid is then added dropwise at 5°–10° and at pH 8–9, maintained by adding 4N sodium carbonate solution.

The dye which is present in a clear, pure black solution has the structure

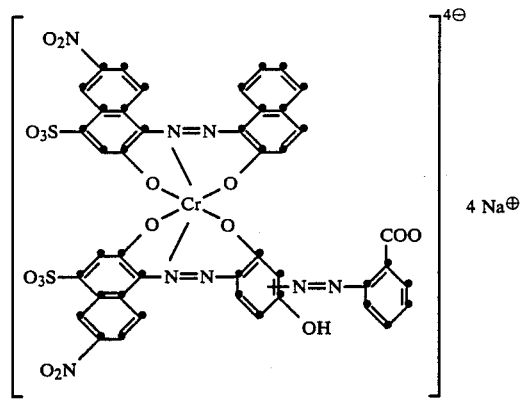

and is precipitated by sprinkling in of sodium chloride and neutralizing with dilute hydrochloric acid, isolated by filtration, washed with sodium chloride solution, dried in vacuo at 80°, and finally ground. The readily water-soluble dye gives full, slightly bluish black dyeings having good fastness properties on chromed leather or retanned leather.

EXAMPLE 7

40.5 parts of the monoazo dye which can be obtained by known methods from 1-diazo-2-hydroxy-6-nitronaphthalene-4-sulfonic acid and 1,3-dihydroxybenzene are coupled as in Example 4 with the diazonium compound prepared from 27.5 parts of 2-aminobenzene-1-carboxylic acid, to give the analogous trisazo dye. If this trisazo dye, as further related in Example 4, is then reacted with the 1:1 chromium complex of the monoazo dye prepared from 1-diazo-2-hydroxy-6-nitronaphthalene-4-sulfonic acid and 2-hydroxynaphthalene in order to prepare the asymmetrical complex as a single product, the dye formed has the following structure:

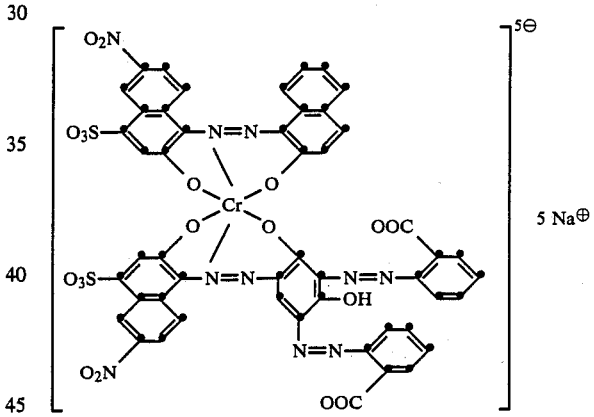

and dyes chromed leather and retanned leather in fast, greenish black shades.

EXAMPLE 8

20.25 parts of the monoazo dye prepared from 1-diazo-2-hydroxy-6-nitronaphthalene-4-sulfonic acid and 1,3-dihydroxybenzene and 21.95 parts of the monoazo dye prepared from 1-diazo-2-hydroxy-6-nitronaphthalene-4-sulfonic acid and 2-hydroxynaphthalene are suspended together in 500 parts of water at 70°, and the suspension is brought to pH 8.0–8.2 by means of 2N sodium hydroxide solution. 125 parts of a solution of sodium disalicylatochromate-(III) containing 3.07% by weight of $Cr_2O_3$ are added, and the reaction mixture is heated to the boil and then stirred under reflux until the two starting materials are no longer detectable. The clear, violet-tinged black reaction solution is cooled down to 3°–8°, and a conventionally prepared solution of the diazonium chloride of 8 parts of 4-chloro-1-aminobenzene is added dropwise with stirring at pH 8–9, maintained by adding 4N sodium carbonate solution. When the coupling has ended, there is present a mixture in which the asymmetrical complex of the formula

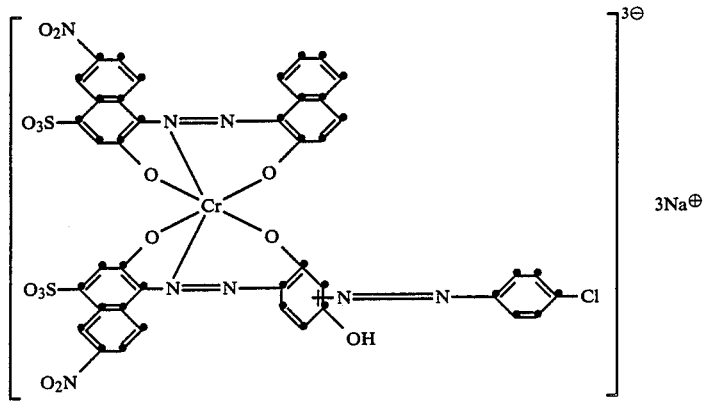

is the main product and the two corresponding symmetrical 1:2 complexes are byproducts. The readily water-soluble dye obtained by evaporating the chroming soluton to dryness gives high-hiding, slightly reddish black dyeings on leather which have good fastness properties.

The procedure described above is repeated, except that a mixture of 32.4 parts of the above mentioned monoazo dye prepared from 1,3-dihydroxybenzene and 8.78 parts of the specified monoazo dye prepared from 2-hydroxynaphthalene is chromed under the abovementioned conditions, affording a black leather dye which has similar coloristic properties but is somewhat more reddish.

EXAMPLE 9

34.1 parts of the metal-free trisazo dye described in Example 4 and 21.95 parts of the monoazo dye prepared from 1-diazo-2-hydroxy-6-nitronaphthalene-4-sulfonic acid and 2-hydroxynaphthalene are jointly chromed as in Example 8 to give a mixture of the two symmetrical 1:2 complexes with the corresponding asymmetrical complex, the main product. The dye obtained on evaporating to dryness and grinding gives full, fast black dyeings on chromed leather and on retanned leather.

EXAMPLE 10

43.9 parts of the monoazo dye prepared from 1-diazo-2-hydroxy-6-nitronaphthalene-4-sulfonic acid and 2-hydroxynaphthalene, in the form of the 1:1 chromium complex, and 40.5 parts of the monoazo dye described in Example 1 and prepared from 1-diazo-2-hydroxy-6-nitronaphthalene-4-sulfonic acid and 1,3-dihydroxybenzene are reacted as in Example 2 to give the asymmetrical chromium complex as the sole product.

The reaction solution obtained is cooled down to 3°-8°, and 12 parts of anhydrous sodium carbonate are added. A solution of two diazonium compounds which has been prepared in a conventional manner from 5.9 parts of 4-methyl-1-aminobenzene and 7.0 parts of 4-chloro-1-aminobenzene together is then added dropwise at 3°-8° and at pH 8.5-9.5, maintained by means of a 4N sodium carbonate solution. When the coupling has ended, the dye is isolated as described in Example 1. The complex dye obtained can be used to obtain full, fast black shades on chromed leather and on retanned leather.

EXAMPLE 11

40.5 parts of the monoazo dye which can be prepared by known methods from 1-diazo-2-hydroxy-6-nitronaphthalene-4-sulfonic acid and 1,3-dihydroxybenzene are converted as in Example 1 into the 1:1 chromium complex, which is then coupled in an alkaline solution at 3°-8° with the diazonium compound prepared in a conventional manner from 23 parts of 1-amino-2-nitrobenzene-4-sulfonic acid. The resulting 1:1 chromium complex of the disazo dye is precipitated by adding sodium chloride, isolated by filtration, and washed with dilute sodium chloride solution. The paste of the 1:1 chromium complex is suspended in 1,200 parts of water at 70°. 15.4 parts of 4-nitro-2-amino-1-hydroxybenzene and 12.2 parts of 2-hydroxybenzaldehyde are added, and the reaction mixture is heated to 80°-85°, brought to pH 7-7.5 by adding 5N sodium hydroxide solution, and stirred at this pH range until starting products are no longer detectable. A clear, deep brown solution is obtained.

The new complex dye has the following structure

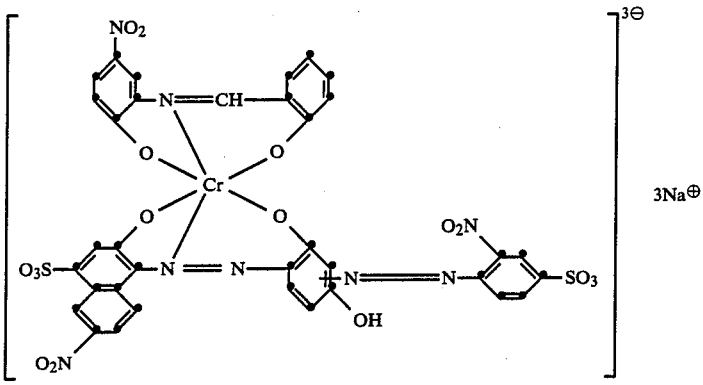

and is isolated by evaporating the reaction solution; it dyes chromed leather and retanned leather in dark brown shades of generally good fastness properties.

EXAMPLE 12

38.8 parts of the conventionally prepared 1:1 chromium complex of the azomethine dye prepared from 1-hydroxy-2-amino-4-nitrobenzene-6-sulfonic acid and 2-hydroxybenzaldehyde are suspended in 1,200 parts of water at 70°. 68.2 parts of the metal-free trisazo dye prepared as in Example 4 are added, and the suspension is heated to 90°-95° and stirrred at this temperature and pH 7-8, maintained by the dropwise addition of 2N sodium hydroxide solution, until the starting materials can no longer be detected.

The clear reaction solution obtained contains a single product, namely the asymmetrical chromium complex of the following structure:

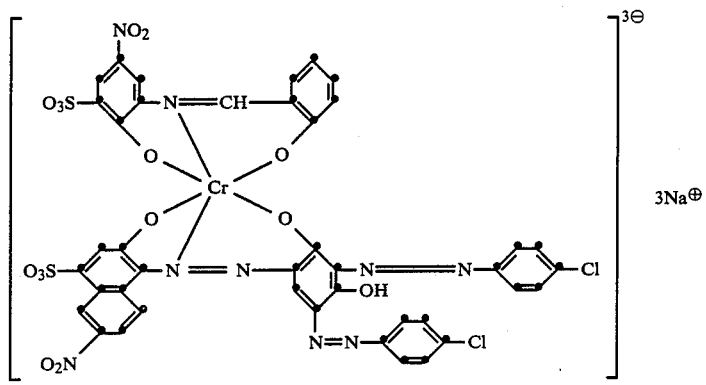

The dye, precipitated by adding sodium chloride, isolated by filtration, and dried, gives level, fast olive brown shades on leathers of different origin.

Dyes having similar propertie are obtained when azomethine dyes mentioned in column II are reacted as in Examples 11 and 12 respectivelywith azo dyes listed in column III to give as asymmetrical chromium complex as the sole product. The dyes dye leather in the shades noted in column IV, which have good fastness properties.

| Azomethine dye | Azo dye used as 1:1 chromium complex | Shade |
|---|---|---|
| 1. ![structure] | ![structure] | Olive brown |
| 2. | | |

-continued

| Azomethine dye | Azo dye used as 1:1 chromium complex | Shade |
|---|---|---|
| [structure: 2-hydroxy-N=CH-2-hydroxyphenyl with SO₃H] | " | Olive brown |
| 3. [structure: 2-hydroxy-4-nitro-N=CH-2-hydroxyphenyl] | [structure with HO₃S, NO₂, OH, OCH₃, SO₃H] | Olive brown |
| 4. [structure: HO₃S, OH, N=CH, OH, NO₂] | [structure with OH, HO₃S, NO₂, OH, OH, OCH₃, SO₃H] | Olive brown |
| 5. [structure: OH, N=CH, OH, NO₂] | [structure with HO₃S, NO₂, OH, OH, [N=N-naphthyl-SO₃H]₂] | Olive brown |
| 6. " | [structure with HO₃S, NO₂, OH, OH, [N=N-naphthyl-SO₃H]₂] | Olive brown |
| 7. | | |

-continued

| Azomethine dye | Azo dye used as 1:1 chromium complex | Shade |
|---|---|---|
| (structure with O₂N, OH, N=CH, OH, SO₃H) | (structure with OH, OH, SO₃H, N=N, N=N, OH, NO₂, HO₃S, NO₂) | Dark brown |
| 8. (structure with COOH, N=CH, OH) | " | Brown |
| 9. (structure with COOH, N=CH, OH, SO₃H) | " | Brown |
| 10. (structure with COOH, N=CH, OH, SO₃H) | " | Brown |
| 11. (structure with OH, N=CH, OH, NO₂ and naphthyl) | (structure with OH, OH, SO₃H, N=N, N=N, OH, NO₂, HO₃S, NO₂) | Dark brown |
| 12. (structure with O₂N, OH, N=CH, OH, SO₃H and naphthyl) | " | Dark brown |
| 13. | | |

-continued

| Azomethine dye | Azo dye used as 1:1 chromium complex | Shade |
|---|---|---|
| [structure: 2-hydroxy-phenyl-N=CH-2-hydroxy-5-nitrophenyl] | " | Dark brown |
| 14. | | |
| [structure: 3-sulfo-5-nitro-2-hydroxyphenyl-N=CH-2-hydroxyphenyl] | [structure: sulfo-nitro-naphthol–N=N–dihydroxyphenyl–N=N–nitro-sulfophenyl] | Dark brown |
| 15. | | |
| " | [structure: sulfo-nitro-naphthol–N=N–dihydroxyphenyl–N=N–tolyl(CH₃)] | Olive brown |
| 16. | | |
| [structure: 2-hydroxy-4-nitrophenyl-N=CH-2-hydroxy-5-(4-sulfophenylazo)phenyl] | " | Olive brown |
| 17. | | |

| Azomethine dye | Azo dye used as 1:1 chromium complex | Shade |
|---|---|---|
| 18. (structure with HO₃S, OH, N=CH, NO₂, N=N, SO₃H groups) | (structure with OH, N=N, HO₃S, NO₂, OH, N=N, Cl) | Dark brown |
| 19. " | (structure with OH, N=N, HO₃S, OH, N=N, phenyl) | Dark brown |
| 20. COOH-CH₂-N=CH-(phenyl-OH) | (structure with OH, N=N, HO₃S, NO₂, OH, N=N, SO₃H, NO₂) | Olive brown |
| 21. COOH-(CH₂)₂-N=CH-(phenyl-OH) | " | Olive brown |
| 22. COOH-CH(CH₃)-N=CH-(phenyl-OH) | " | Olive brown |

-continued
| Azomethine dye | Azo dye used as 1:1 chromium complex | Shade |
|---|---|---|
|  | " | Olive brown |
| 23. 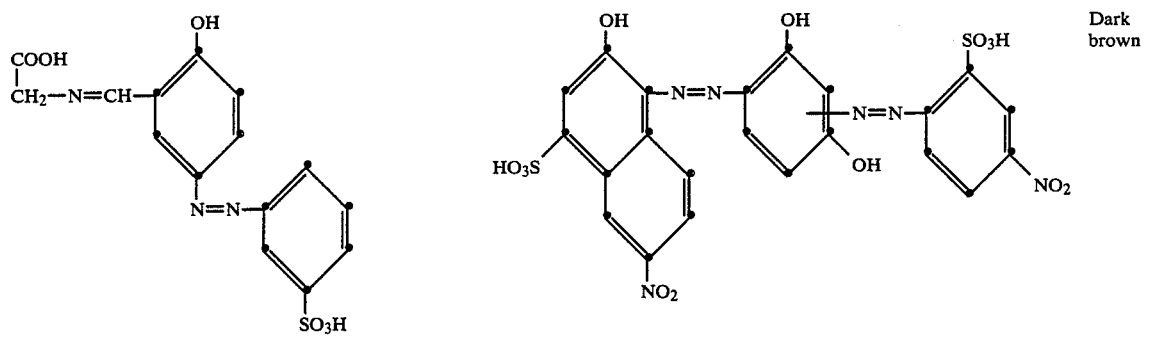 | 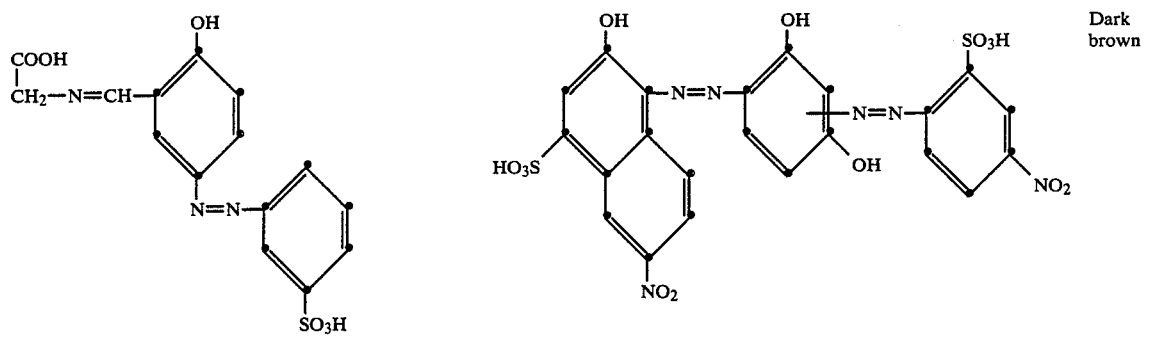 | Dark brown |
| 24.  | " | Dark brown |
| 25. 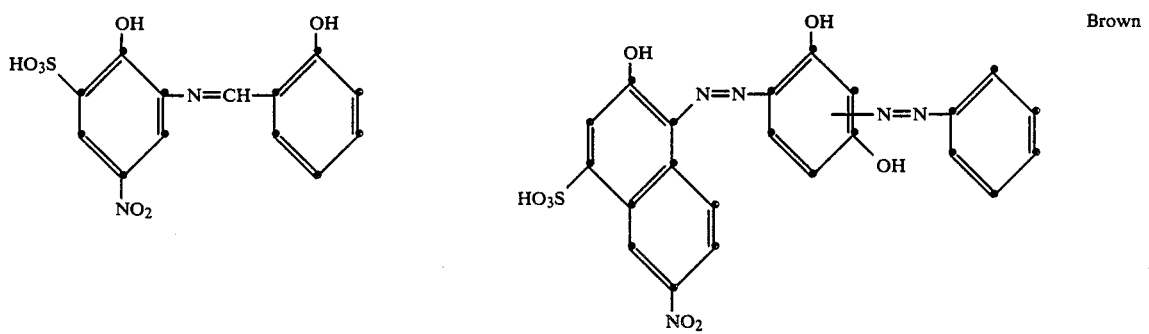 | 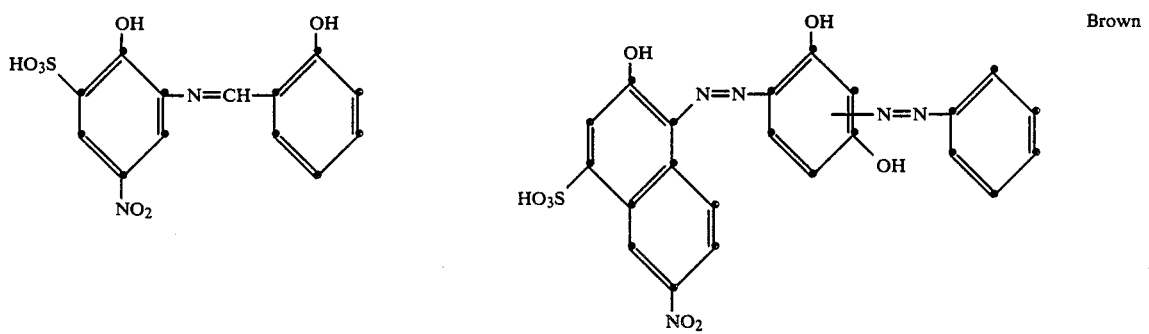 | Brown |
26.

-continued

| Azomethine dye | Azo dye used as 1:1 chromium complex | Shade |
|---|---|---|
| (structure with HO₃S, OH, N=CH, OH, SO₃H, N=N, NO₂) | (structure with OH, N=N, OH, N=N, HO₃S, OH, NO₂) | Olive brown |
| 27. (structure with OH, N=CH, OH, SO₃H) | " | Brown |
| 28. (structure with OH, N=CH, OH, SO₃H, N=N, SO₃H) | " | Olive brown |
| 29. (structure with COOH, CH₂—N=CH, OH, SO₃H, N=N) | (structure with OH, N=N, OH, N=N, HO₃S, OH, NO₂) | Olive brown |
| 30. (structure with COOH, CH₂CH₂—N=CH, OH, N=N, SO₃H) | " | Olive brown |
| 31. | | |

| Azomethine dye | Azo dye used as 1:1 chromium complex | Shade |
|---|---|---|
| COOH-CH(CH₃)-N=CH-[4-hydroxyphenyl-N=N-phenyl-SO₃H] | " | Olive brown |

Dyeing method for leather 100 parts of clothing velour leather (dry weight) are drummed at 50° for 2 hours in a solution of 1,000 parts by volume of water and 2 parts of 24% ammonia, and then dyed at 60° for 1 hour in a solution of 1,000 parts by volume of water, 2 parts of 24% ammonia, and 6 parts of the dye of Example 8. A solution of 40 parts by volume of water and 4 parts of 85% formic acid is added to the dye-bath, and dyeing continues for a further 30 minutes. The leather pieces are then thoroughly rinsed and, if desired, further treated at 50° for 30 minutes with 2 parts of a dicyanodiamide/formaldehyde condensation product.

Other velour leathers and glove leathers can be dyed in the same way.

The black dyeings thus obtained have generally good fastness properties and very great hiding power.

We claim:

1. A chromium complex dye of the formula

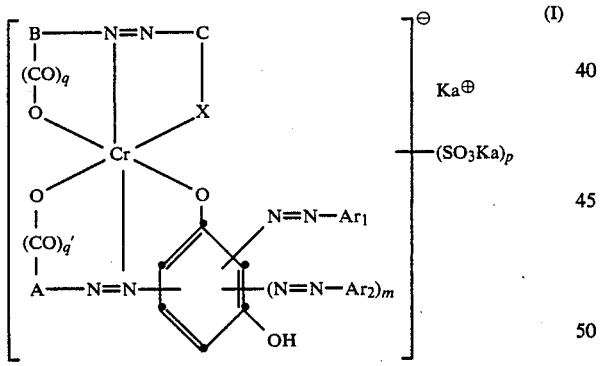

(I)

in which

A is benzene or naphthalene which carries a hydroxyl or carboxyl group in o-position relative to the azo group, and which is unsubstituted or substituted by low molecular weight alkyl or alkoxy, halogen, notro, cyano, sulfo, carboxyl, phosphono, alkylsulfonyl, sulfamides or acylamino selected from the group consisting of low molecular weight alkanoylamino, low molecular weight alkylsulfonylamino, low molecular weight alkoxycarbonylamino, sulfonylamino, aroylamino and arylsulfonylamino, B is benzene or naphthalene which carries a hydroxyl or carboxyl group in o-position relative to the azo group, and which is unsubstituted or substituted by the substituents mentioned for A, C is a coupling component which contains the group X in o- or α-position relative to the azo group and apart from the group X there is no hydroxyl group or unsubstituted amino group if C is a phenol coupling component as defined below, the coupling component C being selected from the group consisting of phenols coupling in o-position and unsubstituted or substituted by low molecular weight alkyl or alkoxy, dialkylamino or acylamino which is $C_1$–$C_4$-alkanoylamino, $C_1$–$C_4$-alkylsulfonylamino, $C_1$–$C_4$-alkoxycarbonylamino, aroylamino or arylsulfonylamino; naphthols which are unsubstituted or substituted by $C_1$–$C_4$-alkyl or alkoxy, chlorine, amino, sulfo or acylamino which is as defined above; 5-pyrazolones or 5-aminopyrazoles each of which has in the 1-position phenyl or naphthyl which is unsubstituted or substituted by chlorine, nitro, $C_1$–$C_4$-alkyl or alkoxy groups or sulfo groups and which have in the 3-position a $C_1$–$C_4$-alkyl or carboxyl group; naphthylamines which are unsubstituted or substituted by sulfo, sulfonamido or sulfone groups; acetoacetamides which, if they contain an anilide nucelus, are unsubstituted in said nucleus or substituted by chlorine, bromine, nitro or $C_1$–$C_4$-alkyl, alkoxy or sulfo groups; 6-hydroxy-3-cyano- or 6-hydroxy-3-carboxamido-4-alkyl-2-pyridones which are substituted in the 1-position by unsubstituted $C_1$–$C_4$-alkyl, β-hydroxyethyl, β-aminoethyl or γ-isopropoxypropyl, or by phenyl, and are unsubstituted in the 4-position or are substituted there by a $C_1$–$C_4$-alkyl group, or hydroxyquinoles, X is oxygen or a group of the formula —NR— in which R is hydrogen or a $C_1$–$C_4$-alkyl group, $Ar_1$ and $Ar_2$ are the same or different and are independently of each other unsubstituted benzene or naphthalene or benzene which is substituted by chlorine, bromine, nitro, sulfo, sulfamoyl, N-monoalkylated or N,N-dialkylated sulfamoyl, alkylsulfonyl, alkyl or alkoxy, or naphthyl which is substituted by sulfo, or thiazolyl, benzothiazolyl, imidazolyl, quinolinyl, oxazolyl or benzoxazolyl, m is 0 to 1, q and q' independently of each other are 0 or 1, p is an integer from 0 to 6, and $Ka^\oplus$ is a cation.

2. A dye according to claim 1, in which A and B independently of each other are 1-hydroxy-2-aminobenzene or 1-amino-2-hydroxynaphthalene which is unsubstituted or substituted by halogen, nitro or sulfo.

3. A dye according to claim 2, in which A and B independently of each other are 1-amino-2-hydroxy-4- sulfonaphthalene which is unsubstituted or substituted in the 6-position by halogen, nitro or sulfo.

4. A dye according to claim 1, in which C is a 1- or 2-naphthol which is unsubstituted or substituted by amino or sulfo, 1- or 2-naphthylamine which is unsubstituted or substituted by sulfo, p-alkyl-($C_1$-$C_6$)-phenol, 1-phenyl-3-methyl-5-pyrazolone or acetoacetanilide, where the phenyl group in the two latter compounds is unsulstituted or substituted by $C_1$-$C_4$-alkyl, $C_1$-$C_4$-alkoxy, chlorine or sulfo.

5. A dye according to claim 1, in which $Ar_1$ and $Ar_2$ each is phenyl which is unsubstituted or substituted by chlorine, bromine, nitro, sulfo, sulfamoyl, N-monoalkylated or N,N-dialkylated sulfamoyl, alkylsulfonyl, alkyl or alkoxy, or naphthyl which is unsubstituted or substituted by sulfo.

6. A dye according to claim 1, of the formula III

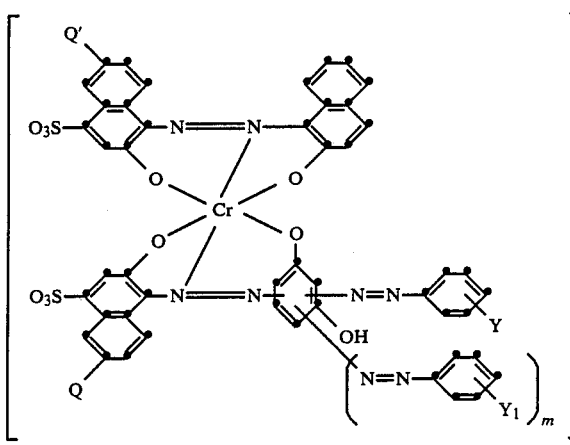

in which Y and $Y_1$ independently of each other are hydrogen, chlorine, methyl, ethyl, methoxy, ethoxy, sulfo or nitro, Q and Q' independently of each other are hydrogen or nitro, and m is 0 to 1.

7. A dye according to claim 6, in which Q and Q' are nitro, and Y and $Y_1$ are chlorine.

8. A dye according to claim 1, of the formula II

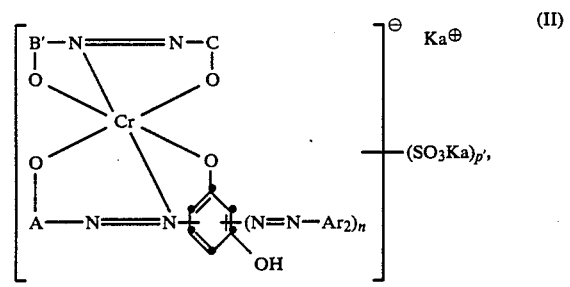

in which
B' is benzene or naphthalene which carries a hydroxyl group in o-position relative to the azo group, and which is unsubstituted or substituted by the substituents mentioned for A,
n is a number between 1 and 2,
p' is 2, 3 or 4, and
$Ka^\oplus$ is a cation.

9. A dye according to claim 8, in which A and B' independently of each other are 1-hydroxy-2-aminobenzene or 1-amino-2-hydroxynaphthalene which is unsubstituted or substituted by nitro or sulfo, C is 1- or 2-naphthol which is unsubstituted or substituted by amino or sulfo, 1- or 2-naphthylamine which is unsubstituted or substituted by sulfo, p-alkyl-($C_1$-$C_6$)-phenol, 1-phenyl-3-methyl-5-pyrazolone or acetoacetanilide, where the phenol group in the two latter compounds is unsubstituted or substituted by $C_1$-$C_4$-alkyl, $C_1$-$C_4$-alkoxy, chlorine or sulfo, or sulfonaphthylazo, $Ar_2$ is phenyl which is unsubstituted or substituted by chlorine, bromine, nitro, sulfo, sulfamoyl, N-monoalkylated or N,N-dialkylated sulfamoyl, alkylsulfonyl, alkyl or alkoxy or naphthyl which is unsubstituted or substituted by sulfo, p' is 2, 3 or 4, and $Ka^\oplus$ is a cation.

10. A dye according to claim 9, in which A and B' independently of each other are 1-amino-2-hydroxy-4-sulfonaphthalene which in the 6-position is unsubstituted or substituted by halogen, nitro or sulfo, and the remaining symbols are as defined in claim 21.

11. A dye mixture comprising an asymmetrical 1:2 chromium complex of the formula I of claim 1 and a symmetrical 1:2 complex containing 2 molecules of a dye of the formula

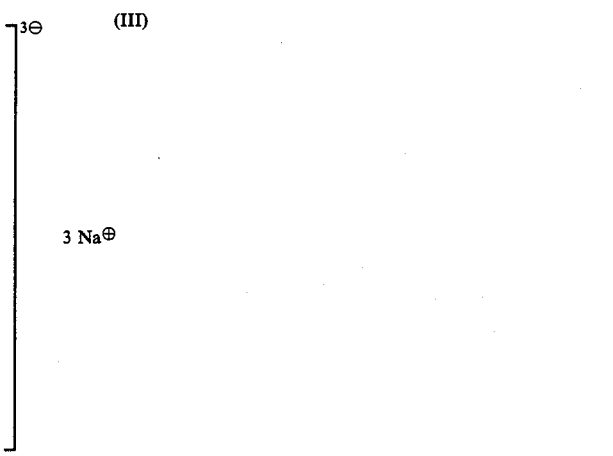

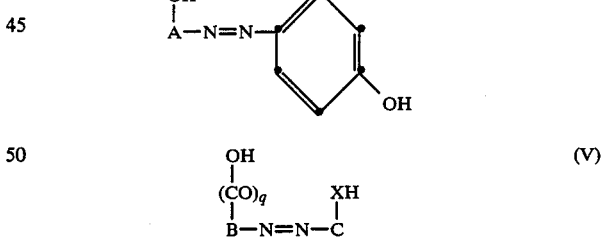

obtained by reacting a mixture of an azo dye of the formula IV and an azo dye of the formula V with a chromium agent, and then coupling the product with a diazonium compound of the formula

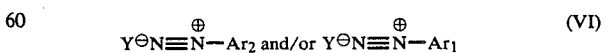

wherein $Y^\ominus$ is an anion.

12. A process for dyeing wool, polyamide, leather, using a metal complex dye according to claim 1.

13. A process according to claim 12 wherein leather is dyed using a metal complex dye.